United States Patent [19]
Furukawa

[11] 4,441,005
[45] Apr. 3, 1984

[54] EDM PULSE GENERATOR WITH A VARIABLE OUTPUT INDUCTOR FOR PRODUCING PULSE WITH GRADUALLY RISING EDGES

[75] Inventor: Toshihiko Furukawa, Yamato, Japan

[73] Assignee: Sodick Co., Ltd., Yokohama, Japan

[21] Appl. No.: 256,765

[22] Filed: Apr. 23, 1981

[30] Foreign Application Priority Data

May 6, 1980 [JP] Japan ................................. 55-58742
Aug. 20, 1980 [JP] Japan ............................... 55-113393

[51] Int. Cl.³ ............................................. B23P 1/08
[52] U.S. Cl. ................................ 219/69 C; 219/69 P
[58] Field of Search ................. 219/69 C, 69 P, 69 R, 219/69 M, 69 S, 68

[56] References Cited

U.S. PATENT DOCUMENTS 3,283,116 11/1966 Scarpelli ............................ 219/69 P
3,419,754 12/1968 Schierholt ......................... 219/69 C
4,242,555 12/1980 Delpretti ........................... 219/69 C Primary Examiner—M. H. Paschall
Attorney, Agent, or Firm—James Creighton Wray

[57] ABSTRACT

An electrical discharge machine having a non-storage type power supply for generating working pulses to be applied across a gap between an electrode and a workpiece for cutting the workpiece comprises an induction coil for reducing the sharpness of the leading edge of the working pulses supplied from the power supply to obtain working pulses with a gradual rise. When electrical discharge machining is carried out using such pulses, the resulting concave portion produced by each pulse is shallower in depth and larger in diameter than those produced by conventional working pulses. As a result, the roughness of the machined surface becomes small.

3 Claims, 6 Drawing Figures

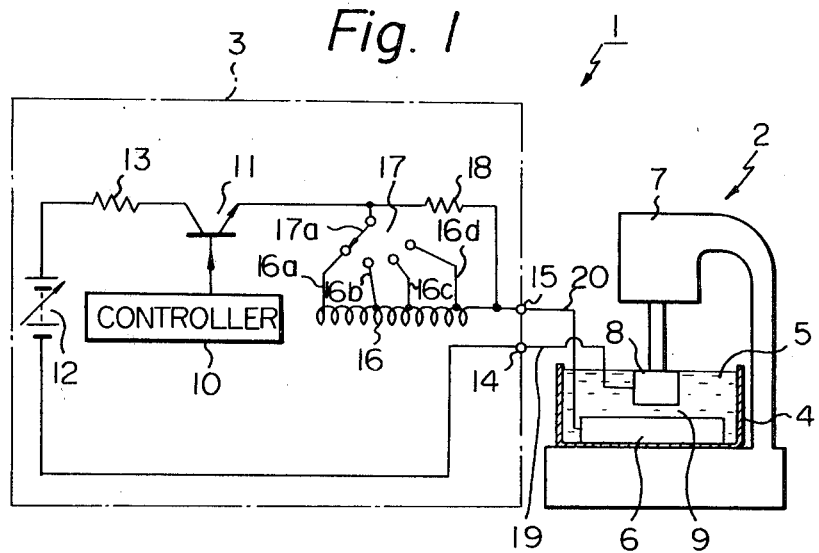
Fig. 1
Fig. 2
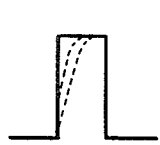
Fig. 3A
PRIOR ART
Fig. 3B
PRIOR ART
Fig. 4A
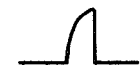
Fig. 4B

EDM PULSE GENERATOR WITH A VARIABLE OUTPUT INDUCTOR FOR PRODUCING PULSE WITH GRADUALLY RISING EDGES

The present invention relates to an electrical discharge machining apparatus, and more particularly to an electrical discharge machining apparatus having an improved power supply circuit for generating pulses used for electrical discharge machining, which makes it possible to obtain a machined surface with small roughness or a glossy surface.

In the case where an electrical discharge machine employing a non-storage type power source for generating working pulses is used, it is well known that reducing the pulse width of the working pulses makes it possible to obtain a surface of smaller roughness. Therefore, in the conventional non-storage type power source for generating working pulses in order to improve the smoothness of the machined surface attempts have been made to provide pulses having a narrower pulse width by the use of high-performance, high-frequency switching elements. However, since pulses of this type are required to have a large peak voltage (of several tens of volts), the minimum pulse width obtainable in view of the switching response characteristics of the switching elements usable for such a high voltage will, at best, be 1 $\mu$sec. However, when the effective discharging rate is taken into consideration the minimum practical pulse width is about 2 $\mu$sec. Even when electrical discharge machining is carried out using pulses of such a narrow width, the roughness of the worked surface is about $\mu$R max at best. Therefore, when a finer surface finish is required, an additional step is needed. As a result, the number of steps and the cost of the machining work are increased.

One object of the present invention is to provide an electrical discharge machining apparatus which is able to machine a workpiece to small surface roughness without reducing the pulse width below that mentioned above.

Another object of the present invention is to provide an electrical discharge machining apparatus which can machine the surface of a workpiece to a precise and glossy finish.

The inventor conducted experiments and research through which he learned that the concave formed in the workpiece by a working pulse becomes shallower in depth and wider in diameter when the working pulse is made relatively narrow and its rising edge is given a gradual rise, and moreover, that the polarity of the working pulse applied across the gap between the electrode and the workpiece has an effect on the degree of roughness of the surface finish.

According to the present invention, an electrical discharge machine having a non-storage type power supply for generating working pulses to be applied across a gap between an electrode and a workpiece for cutting the workpiece comprises an induction coil for reducing the sharpness of the leading edge of the working pulses supplied from the power supply to obtain working pulses with a gradual rise. The pulse width of the working pulses with the gradual rise is made relatively narrow, for example, between 2 $\mu$sec. and 10 $\mu$sec. When electrical discharge machining is carried out using such pulses, the resulting concave portion produced by each pulse is shallower in depth and larger in diameter than those produced by conventional working pulses. As a result, the roughness of the machined surface becomes small. Moreover, when the working pulses are applied across the gap in such a way that the polarity of the workpiece side is positive and that of the electrode side negative in the above-mentioned case, the machined surface becomes a glossy surface regardless of the kind of material of the workpiece. Also a desired degree of roughness can be obtained by adjusting the induction value of the induction coil. Since extremely small roughness can be obtained without reducing the pulse width of the working pulses to an excessive degree, an inexpensive switching element can be employed so as to keep the cost of the apparatus low.

It is a feature of the present invention that a glossy machined surface can be obtained by electrical discharge machining without reducing the pulse width of the working pulses to an extreme degree. More specifically, it is not required to reduce the pulse width below the conventional limit determined by the response characteristics of the switching element.

Further objects and advantages of the present invention will be apparent from the following detailed description to be read in conjunction with the accompanying drawings in which:

FIG. 1 is a schematic view of an embodiment of an electrical discharge machining apparatus of the present invention;

FIG. 2 is a waveform of the pulse produced in the power supply unit shown in FIG. 1;

FIG. 3A is a waveform of the working pulse according to prior art;

FIG. 3B is a sectional view of a workpiece machined using the working pulse illustrated in FIG. 3A;

FIG. 4A is the waveform of the working pulse used in the apparatus shown in FIG. 1; and FIG. 4B is a sectional view of a workpiece machined by the working pulse illustrated in FIG. 4A.

FIG. 1 is an embodiment of an electrical discharge machining apparatus of the present invention. An electrical discharge machining apparatus 1 is comprised of a body 2 which is schematically illustrated in FIG. 1 and a power supply unit 3 for supplying working pulses which are applied between a workpiece 6 immersed in a suitable dielectric fluid 5 contained in a work tank 4 and an electrode 8 mounted on a head 7 of the body 2. A servo mechanism (not shown) is arranged in the head, and the gap between the electrode 8 and the workpiece 6 can be adjusted to a suitable magnitude for carrying out electrical discharge machining. Since the arrangement of the body 2 as described above is well known, no detailed explanation of its structure or of the structure of the servo mechanism thereof will be given here.

The power supply unit 3 has a switching transistor 11 which is operated so as to be turned ON and OFF by a controller 10. The positive electrode of a direct current power source 12 is connected through a resistor 13 to the collector of the switching transistor 11 and the negative electrode of the power source 12 is directly connected to an output terminal 14. A coreless coil 16 is provided between another output terminal 15 electrically connected to the workpiece 6 and the output circuit of the switching transistor 11 for the purpose of giving a gradual rise to the rising edge of each of the working pulses produced by the switching transistor 11. The degree of the gradual rise can be adjusted by changing the inductance of the coil 16. For the purpose of changing the inductance of the coil 16, there is provided a switch 17 for selectively connecting the emitter of the switching transistor 11 to any one of the taps 16a through 16d of the coil 16.

A resistor 18 is connected between a moveable contact 17a and the output terminal 15 so that the resistor 18 is connected in parallel with the coreless coil 16 irrespective of the switching position of the switch 17. Due to the presence of the resistor 18, since the energy stored in the coreless coil 16 is dissipated in the resistor 18 when the switching transistor 11 is turned OFF, it is possible to prevent an undesired discharge from occurring at the gap 9 because of the energy stored in the coil 16. The output terminals 14 and 15 are connected to the electrode 8 and the workpiece 6 by means of conducting wires 19 and 20, respectively, so that the working pulses are applied across the gap 9 in such a way that the workpiece 6 is at positive potential and the working electrode 8 is at negative potential. As will be described hereinafter in more detail, the selection of the polarity of the working pulses applied to the gap 9 has an important effect on the finished condition of the machined surface.

The controller 10 includes a pulse generator for generating pulses with a desired pulse width and frequency and the controller 10 controls the turn-ON time and the turn-OFF time of the switching transistor 11 by the pulses from the pulse generator. As a result, the pulse width of the pulses derived from the emitter of the switching transistor 11 can be determined so as to be a desired value. For example, the pulse width will be determined to be less than 10 μsec. which is the pulse width in the conventional case when the roughness of the working surface is required to be small, as in finishing. On the other hand, the inductance of the coil 16 is determined in such a way that the leading edge of the working pulses has a gradual rise as illustrated in FIG. 2 by a dash line. The larger the inductance value of the coil is, the more gradual the leading edge of the pulse becomes. It was confirmed by the inventor that the more gradual the rise of the leading edge of the pulses, the smaller the roughness of the machined surface becomes.

The reason why the roughness of the machined surface is reduced by giving a gradual rise to the leading edge of working pulses having a narrow width of less than 10 (μ sec.) is as follows:

The diameter of a concave produced by a conventional narrow-width pulse such as that illustrated in FIG. 3A is small as illustrated in FIG. 3B, but the depth of the concave is relatively deep. On the other hand, when in addition to reducing the width of the working pulse the leading edge of the pulse is given to a gradual rise as illustrated in FIG. 4A, the resulting concave is shallower and the diameter of the opening is larger as illustrated in FIG. 4B. The inventor of the present invention confirmed by experiment that the roughness of the machined surface in electrical discharge machining can be reduced to less than 1 μR max when machining is carried out by the use of working pulses having a gradual rise characteristic. In addition, in order to obtain such a small roughness, the inductance value of the coil 16 should be made large enough so as not only to give the rising edge of the pulse a gradual rise but also to cancel the stray capacitance on the switching element side as seen from the coreless coil 16. Therefore, an inductance of at least 3 μH inductance will be required in an ordinary apparatus for ordinary operation.

In addition, since the effective discharging rate at the gap 9 becomes lower when the working pulses have a gradual rise, it is preferable that the voltage of the direct current power source 12 be increased to prevent the effective discharge rate from being reduced. The voltage of the main direct current power source in the conventional apparatus is about 60 to 100 volts. According to an experiment carried out by the inventor, approximately same effective discharge rate as that in the conventional apparatus can be obtained using gradually rising working pulses if the voltage of the direct current power source is made 150 volts or more.

The relationship between the rising characteristic of the working pulse and the resulting condition of the machined surface is as explained above. Now, the relationship between the polarity of the working pulse applied across the gap 9 from the terminals 14 and 15 and the resulting condition of the machined surface will be explained.

Generally speaking, it is decided whether the positive output terminal of the power source should be connected to the workpiece or to the working electrode depending on the workpiece material etc. However, by various experiments made by the inventor, it was confirmed that the resulting condition of the machined surface is remarkably effected by the polarity of the working pulses applied across the gap 9 when the electrical discharge machining is carried out using working pulses with a narrow pulse width and a gradual rise.

An experiment was run with an iron workpiece and a copper working electrode. The inductance of the coil 16 was selected to be 6 μH, the resistance of the resistor 18 to be 20 Ω, and the applied voltage to be 270 V. The positive output terminal 15 of the power supply unit 3 was connected to the workpiece 6 and the negative output terminal 14 thereof was connected to the working electrode 8. The workpiece was machined by applying working pulses across the gap 3 with the workpiece 5 at positive potential and the working electrode at negative potential. The machined surface of the workpiece 6 not only had small roughness, but also became glossy. Moreover, the experiment was repeated for all combinations of Cu-W and Ag-W electrodes and stainless steel and WC workpieces. The glossy surface was obtained for any combination of electrode and workpiece. Therefore, according to the apparatus of the present invention, no finishing step or mirror finishing step is required in addition to the electrical discharge machining. As a result, the number of steps in electrical discharge machining can be reduced. On the other hand, another experiment was also carried out under the same conditions as those of the above-mentioned case except that the polarity of the working pulses applied to the gap was inverted. In this case, althouth the roughness of the machined surface of the workpiece was smaller than that of a workpiece worked by a conventional electrical discharge machine, the surface was not glossy.

The induction value of 6 μH for the coil, the resistance value of 20 Ω and the voltage of 270 V are merely examples and the present invention is not limited to these conditions.

As described above, a glossy machined surface can be obtained irrespective of the kind of material of the working electrode or the workpiece by reducing the pulse width of the working pulse, giving the working pulse a gradual rise, and selecting the polarity of the working pulse to make the potential of the workpiece positive relative to that of the working electrode. The degree of roughness of the surface of the workpiece can be easily controlled by selecting the position of the switch 9.

It is a feature of the present invention that the manufacturing cost of the electrical discharge machining apparatus can be reduced because no expensive switching element is required since the apparatus can produce a machined surface of small roughness without reducing the pulse width of the working pulse to an extreme degree.

Although only one switching circuit for generating the working pulses is employed in the above mentioned embodiment of the present invention, the present invention is not limited to an electrical discharge machining apparatus having only one switching circuit for generating the working pulses. The present invention is applicable to an apparatus that has a high voltage superposing power source for triggering.

What is claimed is:

1. A working pulse generator for an electrical discharge machining apparatus capable of mirror finishing which provides working pulses to a gap formed between a workpiece and an electrode, said working pulse generator comprising means for repetitively generating pulses having a narrow pulse width of not greater than 10 $\mu$sec. comprising a direct current power source, switching means connected in series with the direct current power source, and controller means for controlling the switching means to repetitively open and close to produce said narrow width pulses at an output, the switching means being a switching transistor and the controller controlling the conducting condition of the switching transistor, an output circuit comprising the parallel combination of a resistor and connected to the output of said pulse generating means for producing a gradual rise in rising portions of said pulses, and means for providing said pulses having gradual rising portions from said output circuit to the machining gap, the providing means applying the pulses across the gap between the electrode and the workpiece in such a way that the potential of said workpiece is higher than that of the electrode.

2. An apparatus as claimed in claim 1 wherein said narrow pulse width is not greater than 10 $\mu$sec.

3. An apparatus as claimed in claim 1 wherein said inductance value of said inductance element is not less than 3 $\mu$H and the voltage of said direct current power source is not less than 150 V.

* * * * *